United States Patent [19]

Pinto

[11] Patent Number: 5,395,159
[45] Date of Patent: Mar. 7, 1995

[54] HEADREST

[76] Inventor: Michael P. Pinto, 46 Parsons Hill Dr., Worcester, Mass. 01603

[21] Appl. No.: 113,287

[22] Filed: Aug. 30, 1993

[51] Int. Cl.⁶ .................................................. A47C 7/38
[52] U.S. Cl. .................................... 297/395; 248/205.8
[58] Field of Search ...................... 297/395; 248/205.8, 248/205.9

[56] References Cited

U.S. PATENT DOCUMENTS

| | | | |
|---|---|---|---|
| 2,351,666 | 6/1944 | Cohen | 254/64 |
| 3,601,445 | 8/1971 | Glynias | 297/395 |
| 3,747,170 | 7/1973 | Kieves | 24/263 |
| 4,043,531 | 8/1977 | Green | 248/518 |
| 4,770,466 | 9/1988 | Pesterfield | 297/391 |
| 5,054,855 | 10/1991 | Williams et al. | 297/395 |

FOREIGN PATENT DOCUMENTS

| | | | |
|---|---|---|---|
| 248632 | 3/1926 | United Kingdom | 248/205.8 |
| 470723 | 8/1937 | United Kingdom | 248/205.8 |

Primary Examiner—Peter R. Brown
Attorney, Agent, or Firm—Blodgett & Blodgett

[57] ABSTRACT

A headrest which is mounted to the rear window of a vehicle. Suction cups permit the headrest to be mounted, positioned and released. A specially designed compression device is utilized between the headrest and suction cup to create an intense vacuum in the suction cup when it is fastened to a window or planar surface. The compression device will fasten the suction cups so the headrest will remain fixed on the window in even the most bumpy rides.

8 Claims, 6 Drawing Sheets

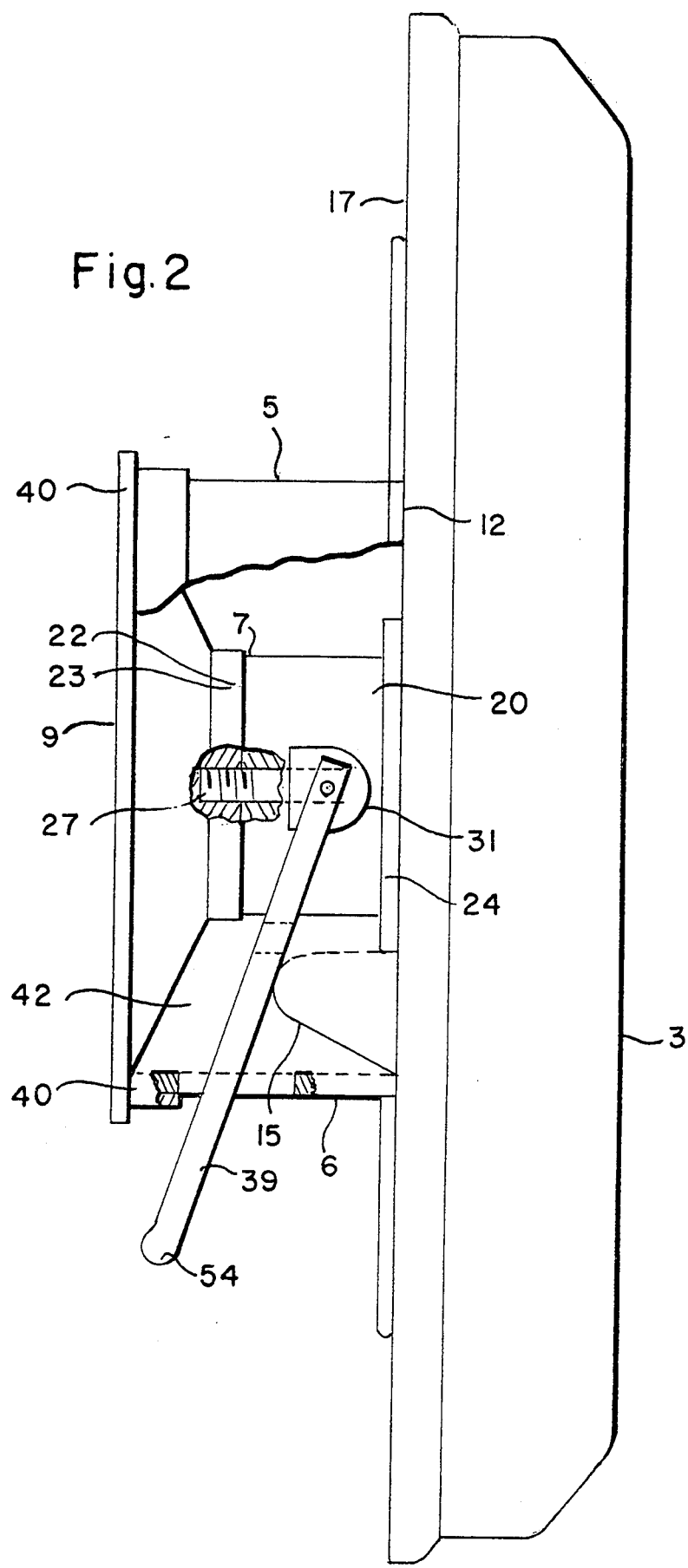

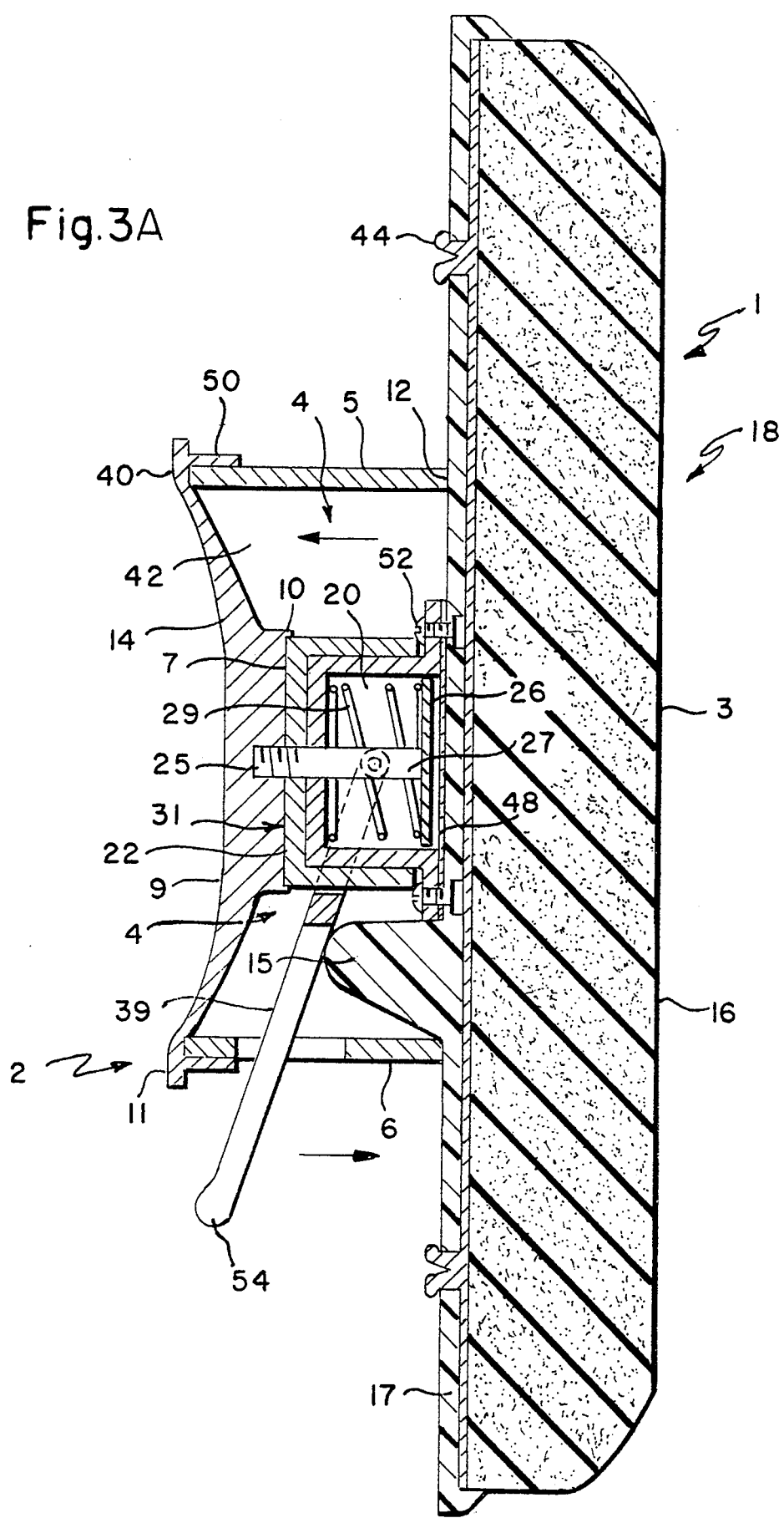

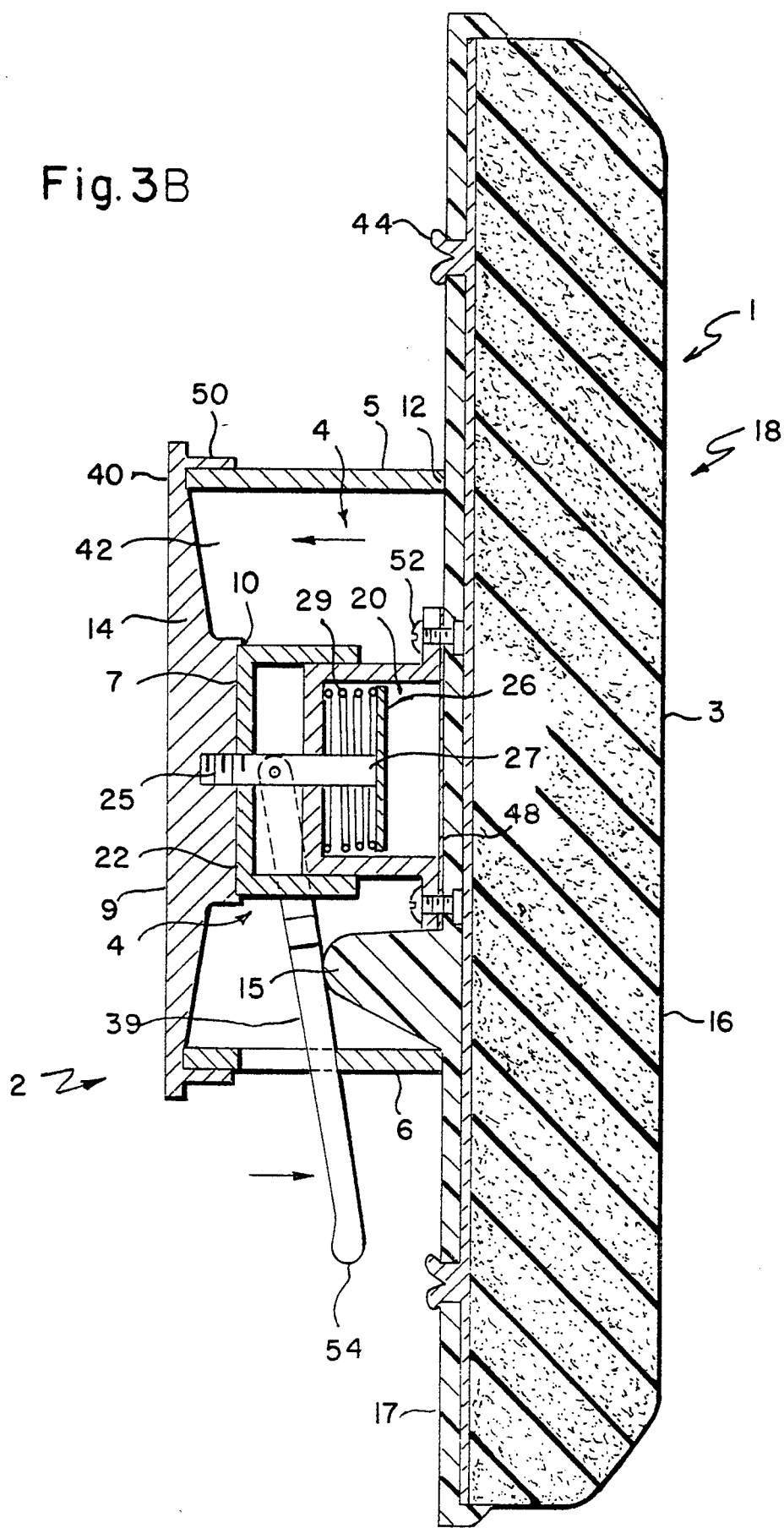

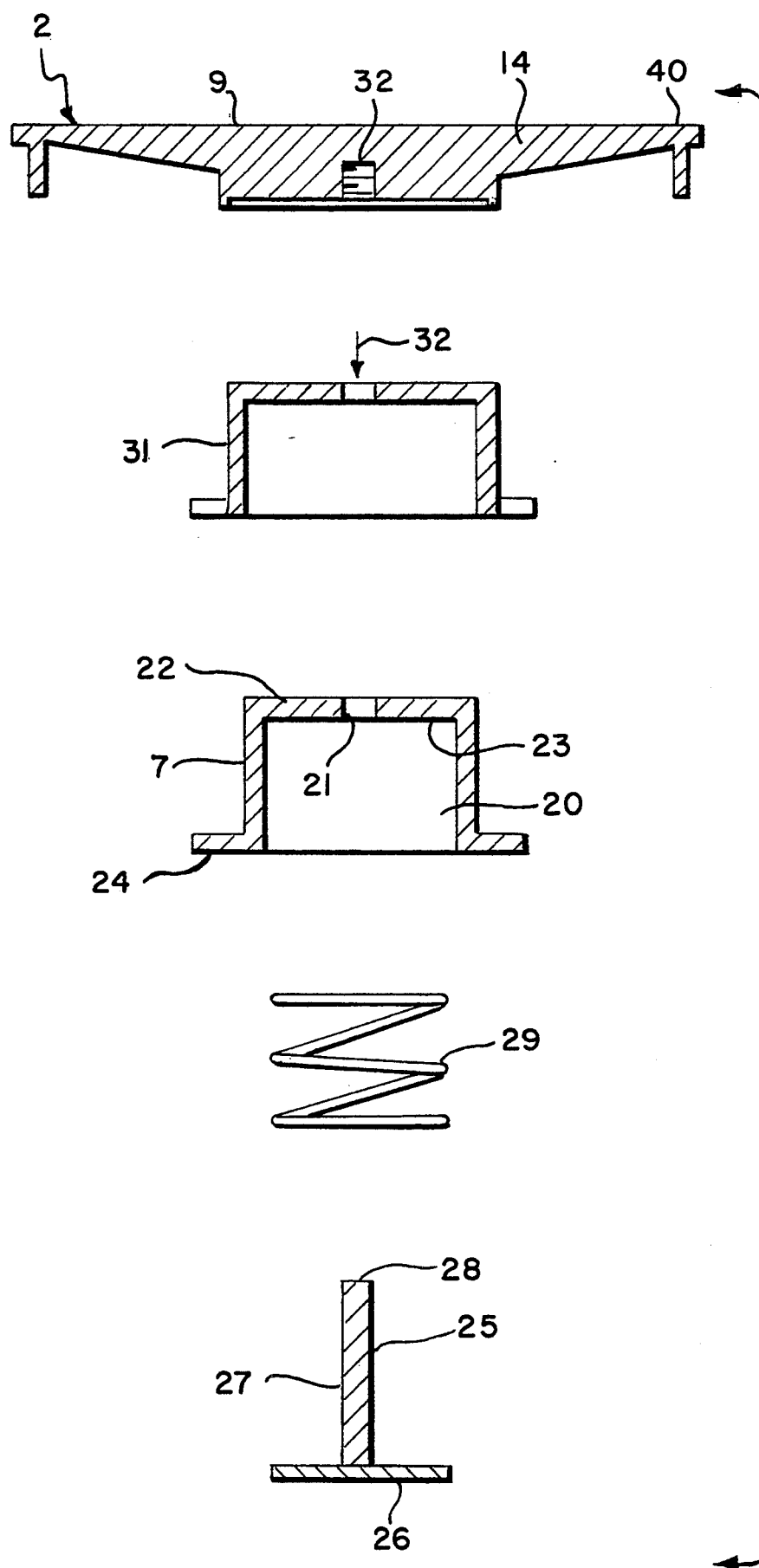

HEADREST

BACKGROUND OF THE INVENTION

The present invention is directed to a detachable window headrest for a pickup truck or similar vehicle which lacks a head support or head protector in the vehicle's back window.

Most pickup trucks and similar vehicles are not equipped with a seat headrest. In the vehicles that do have headrests, such headrests are attached to the vehicle's seat directly and are not fastened to a window. A common problem of prior art devices is the inability of a device to stick to a glass window permanently. Often times, the jarring and movement of the vehicle will cause the prior art devices to disengage the window and fall off. The present invention uses suction cups to attach the headrest to a window. In addition, a special compression means is used between the headrest and suction cup to create an improved vacuum and suction to a glass window. Once the headrest is positioned and the compression means is operated, the headrest will not fall off the window and will be permanently fixed on the vehicles window even in the most jarring and bumpy rides. The present invention is designed to be space efficient and can be easily attached, released, removed and repositioned to a window.

It is therefore, a principal object of the invention to provide for a window mounted seat headrest.

Another object of the invention is the provision of a detachable headrest which is mounted on a vehicle window.

A further object of the present invention is the provision of a detachable window headrest which can be adjusted for use by different individuals.

It is another object of the present invention to provide a headrest and compression means which will allow for a permanent fixation to a window, even in the most bumpy rides.

A still further object of the invention is a headrest compression means which will be cost effective to make and efficient in size.

With these and other objects in view, as will be apparent to those skilled in the art, the invention resides in the combination of parts set forth in the specification and covered by the claims appended hereto.

SUMMARY OF THE INVENTION

A removable headrest for attachment to a planar surface. The headrest comprises an abutment means for cushioning a head, an adhesion means for attaching the headrest to a planar surface and a compression means. The adhesion means may comprise a suction cup or similar device which may be induced to create a vacuum between the suction cup and planar surface. The compression means is spaced from and interposed between the abutment means and the compression means, so that when the compression means is operated, a vacuum will be created in the adhesion means causing the adhesion means and headrest to stick to a planar surface.

BRIEF DESCRIPTION OF THE DRAWINGS

The character of the invention, however, may be best understood by reference to one of its structural forms as illustrated by the accompanying drawings, in which:

FIG. 2 is a side elevation view of the present invention, FIG. 3A is a cross-sectional view of the present invention showing the relationship of parts of the compression means in a new operational mode, FIG. 3B is a cross-sectional view of the present invention showing the relationship of the parts of the compression means in its operational mode, FIG. 4 is an exploded cross-section view of the parts of the compression means absent the stabilizing collar.

DESCRIPTION OF THE PREFERRED EMBODIMENT

Figure 1:
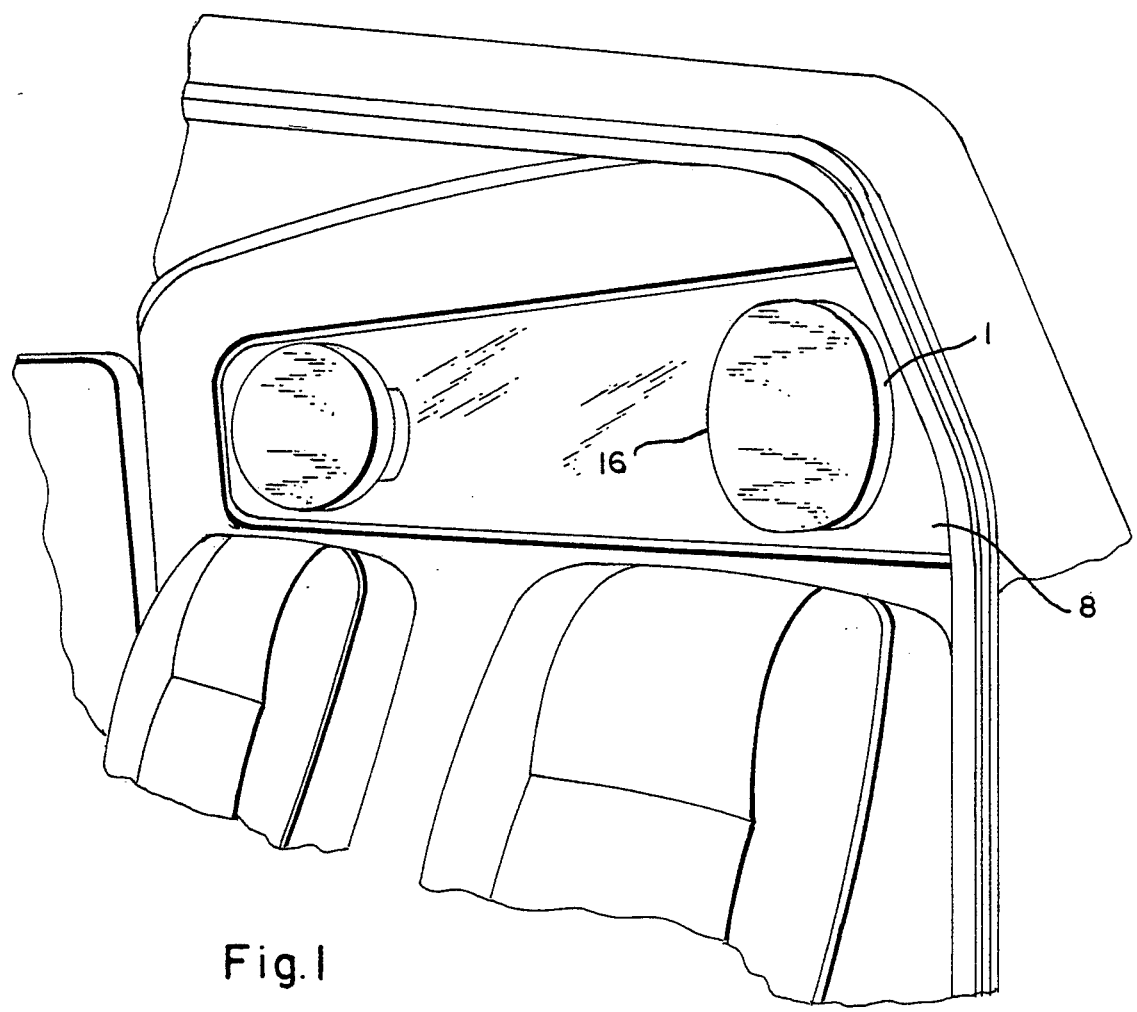
FIG. 1 is general perspective view showing the present invention in its operative mode fastened against a vehicle window.
Figure 5:
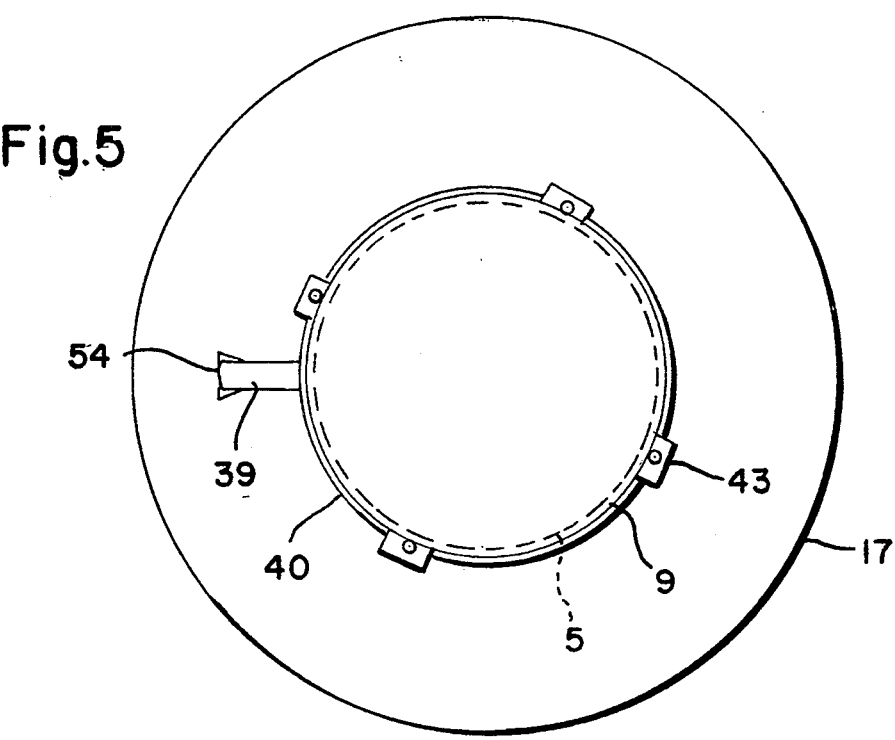
FIG. 5 is a bottom plan view of the present invention.
Figure 7:
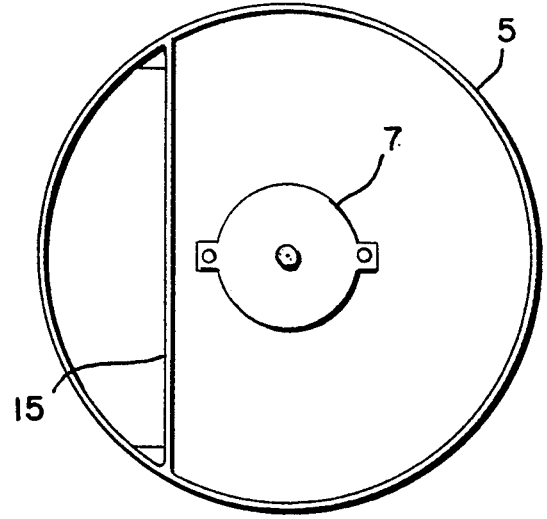
FIG. 7 is a bottom plan view of the stabilizing collar with fulcrum bar positioning.
Figure 6:
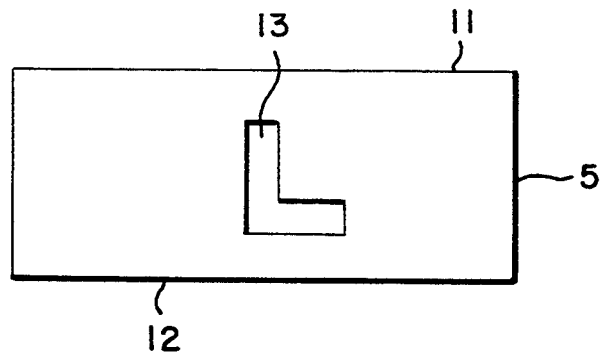
FIG. 6 is a side elevation of the stabilizing collar and L-shaped aperture lock.

Referring to FIGS. 1-3, the present invention is generally indicated by the reference numeral 1 and comprises an adhesion means 2, an abutment means 18, and a compression means 4 (not shown) spaced from and interposed between the abutment means 18 and adhesion means 2.

Adhesion means 2 may comprise a suction cup 9 or similar device made of rubber which attaches to a planar surface 8 by an induced vacuum between the planar surface 8 and suction cup wall 14.

The abutment means 18 generally comprises a high density foam cushion 3. Foam cushion 3 may have a decorative decal 19 placed on its top surface 16. The cushion 3 is fastened to a plastic backing 17 by a screw or tab 44. Plastic backing 17 may be preformed as part of stabilizing collar 5 in the first embodiment of the invention or exist as a separate part in a second embodiment of the invention. In the second embodiment, plastic backing 17 is fastened to stabilizing collar 5.

Compression means 4 comprises stabilizing collar 5, compression housing 7, compression plunger 25, spring 29, compression washer 31 and lever 39. Stabilizing collar 5 has a chamber 42 with a first open end 11 and in the second embodiment in which the stabilizing collars is a separate part, the part also has a second open end 12 opposite the first open end 11. The second open end 12 is attached to plastic backing 17. The chamber 42 of stabilizing collar 5 holds compression housing 7, compression plunger 25, spring 29, and compression washer 31. Lever 39 is in contact with a fulcrum bar 15. The fulcrum bar may be fastened as a separate part to stabilizing collar 5 or be premolded into plastic backing 17. Lever 39 may have a reinforcement to prevent bending of fulcrum bar 15. The reinforcement 46 distributes the force applied to fulcrum bar 15 by lever 39. Compression housing 7 has a chamber 20 with a closed end 23 and open end 24 opposite the closed end 23. Open end 24 is fixed to backing 17 by a screw or similar fastening means 52. A large metal washer 48 may be positioned between plastic backing 17 and compression housing 7 to insure the integrity of the plastic backing against breakage in the event of a severe force from a persons head. Compression plunger 25 is disposed in chamber 20 of compression housing 7 and comprises a head 26 and elongated shaft 27 attached to head 26. Adhesion means 2 is fastened to the free end 28 of elongated shaft 27. Compression washer 31 is interposed and spaced between compression housing 7 and adhesion means 2. Elongated shaft 27 passes through both aperture 21 in closed end 23 of compression housing 7 and aperture 32 of compression washer 31 and is fixed to adhesion means 2. The compression washer 31 is "free floating" and is not fastened to compression housing 7 or adhesion means 2. Lever 39 is fastened to compression washer 31 so that when a force is applied to lever 39, fulcrum bar 15 of stabilizing collars provides a pivot point to exert an opposite directional force on compression means 4, adhesion means 2 and abutment means 18. End of lever 39, as indicated by reference numeral 54, is farthest from plastic backing 17 when compression means 4 is in its non-operational mode and will be closest to plastic backing 17 when compression means 4 is in its operational mode. Adhesion means 2 will then collapse and stick to a surface. Stabilizing collar 5 has an L-shaped aperture lock 13 in its side wall 6 for locking fulcrum bar 15 in place after an operative force is applied to it. It is important to note that both the compression means 4 and abutment means 18 move toward adhesion means 2 after a force is exerted on lever 39. Adhesion means 2 receives the force directly from the compression washer 31. Abutment means 18 receives a similarly directional, but secondary force as a result of elongated shaft 27 being fixed to adhesion means 2. The force imparted by adhesion means 2 and elongated shaft 27 causes the head 26 of compression plunger 25 to collapse spring 29. Spring 29 exerts a similarly directioned force on bottom end wall 22 of compression housing 7 which is attached to the plastic backing 17, abutment means 18, and stabilizing collar 5. This force will be imparted to stabilizing collar 5 which will be in contact with the outer most portion of adhesion means 2 and which will stabilize the vacuum seal at point 40 of suction cup wall 14 from being broken. A flange 50 may be molded into suction cup 9 to support stabilizing collar 5 when it engages suction cup 9 near point 40. The compression means 4, therefore, has a dual function of providing the engaging force for adhesion means 2 as well as stabilizing suction so the headrest will not disengage a glass window.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A removable headrest for attachment to a planar surface, comprising:
   (a) an abutment means for cushioning a head;
   (b) an adhesion means for attaching said headrest to a planar surface; and
   (c) a compression means spaced from an interposed between said abutment means and said adhesion means, said compression means comprising:
      (1) a stabilizing collar having a chamber with a first open end and a second open end spaced from and opposite said first open end, said first open end being attached to said abutment means, said second open end being in contact with said adhesion means;
      (2) a compression housing disposed in said stabilizing collar and attached to said abutment means, said housing having a chamber with an open end and a closed end spaced from and opposite said open end;
      (3) a compression washer spaced from and interposed between said compression housing and said adhesion means;
      (4) a biasing means disposed in said compression housing chamber; and
      (5) a lever in contact with said compression washer for inducing a force on said compression washer and adhesion means.

2. A removable headrest as recited in claim 1, wherein said biasing means comprises:
   (a) a compression plunger disposed in said compression housing chamber having a head and an elongated shaft attached to said head; and
   (b) a spring disposed in said compression housing chamber and extending coextensively about said compression plunger shaft.

3. A removable headrest as recited in claim 2, wherein said vacuum adhesion means is a suction cup.

4. A removable headrest as recited in claim 8, wherein said abutment means comprises a backing fastened to said stabilizing collar and a foam cushion fastened to said backing.

5. A removable headrest for attachment to a planar surface, comprising:
   (a) an abutment means for cushioning a head;
   (b) an adhesion means having a peripheral portion and a central portion which is deformable relative to said peripheral portion away from said abutment means to an active position and toward said abutment means to an inactive position, said adhesion means being attachable to a planar surface when said central portion is in said active position; and
   (c) a compression means which is interposed between said abutment means and said adhesion means, for activating said adhesion means, said compression means comprising:
      (1) a stabilizing collar having a chamber, a first end which is fixed to said abutment means and a second open end which is spaced from and opposite said first end, said second open end engaging the peripheral portion of said adhesion means;
      (2) a compression housing which is disposed in said chamber and which is fixed to said abutment means, said compression housing having a compartment;
      (3) a biasing means which is disposed in said compartment of said compression housing, said biasing means being operatively connected to said central portion of said adhesion means for biasing said central portion of said adhesion means so that said central portion is in said inactive position; and
      (4) an actuating means for moving said central portion of said adhesion means to said active position against the bias of said biasing means.

6. A removable headrest as recited in claim 5, wherein said biasing means comprises:
   (a) a compression plunger disposed in said compression housing chamber having a head and an elongated shaft attached to said head; and
   (b) a spring disposed in said compression housing chamber and extending coextensively about said compression plunger shaft.

7. A removable headrest as recited in claim 6, wherein said adhesion means is a suction cup.

8. A removable headrest as recited in claim 7, wherein said abutment means comprises a backing fastened to said stabilizing collar and a foam cushion fastened to said backing.

* * * * *